United States Patent Office 3,379,079
Patented Apr. 23, 1968

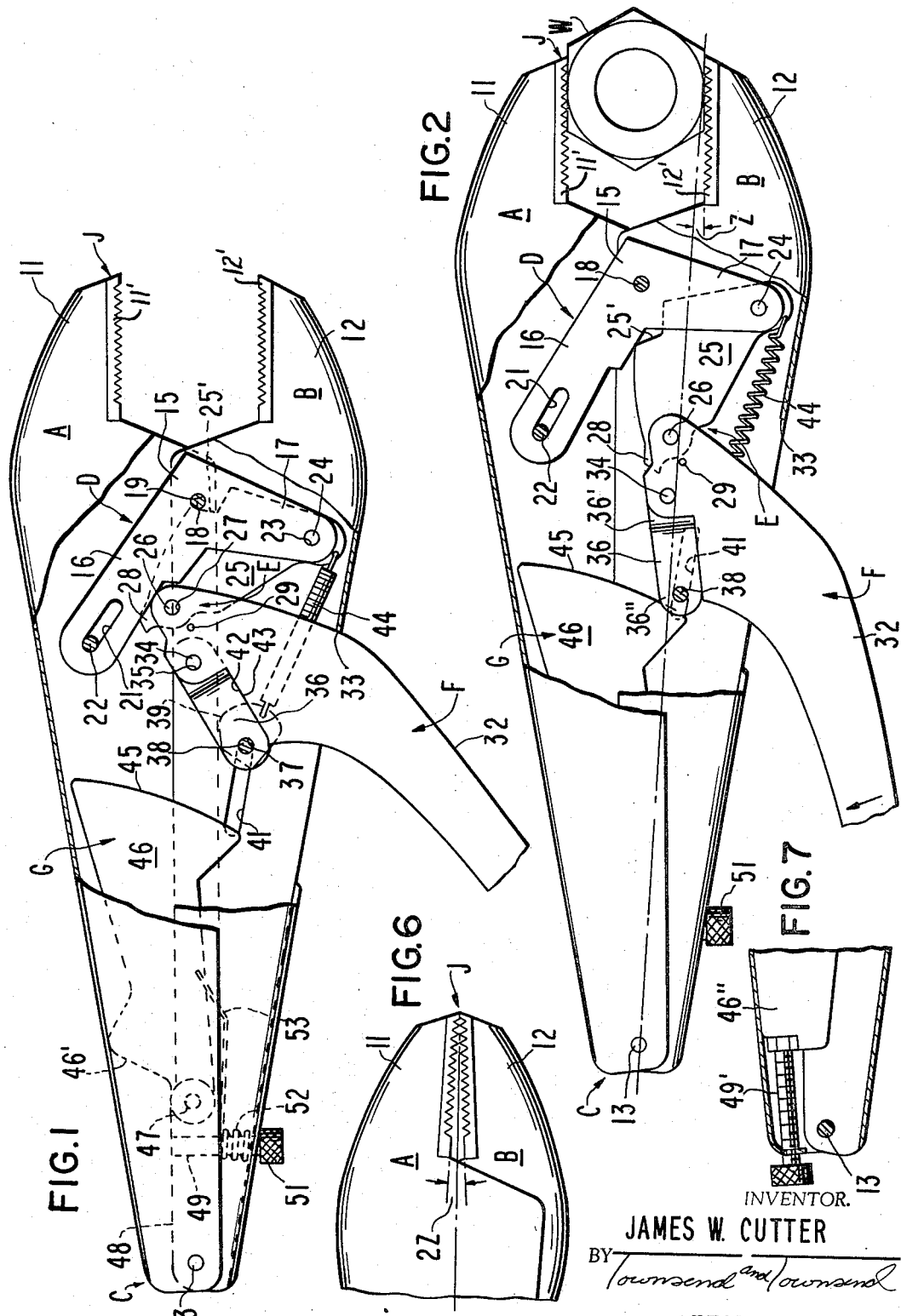

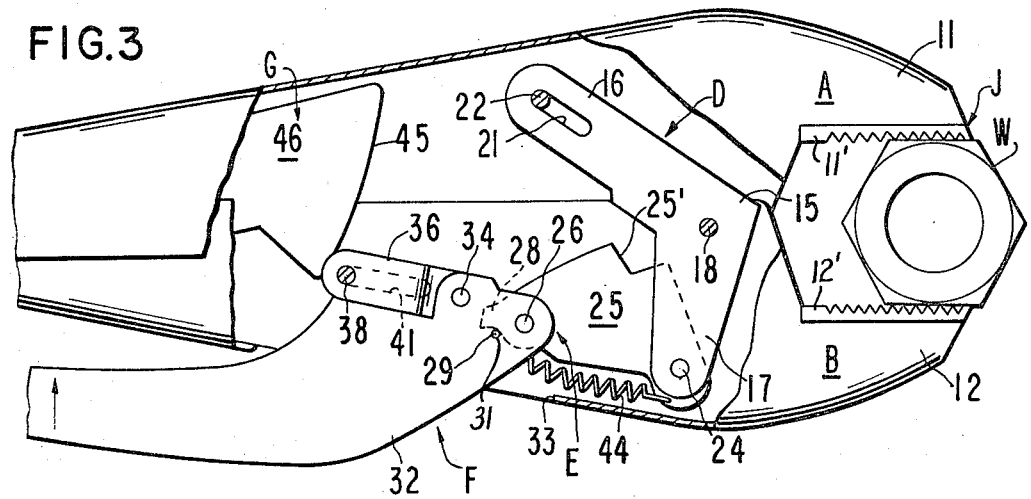
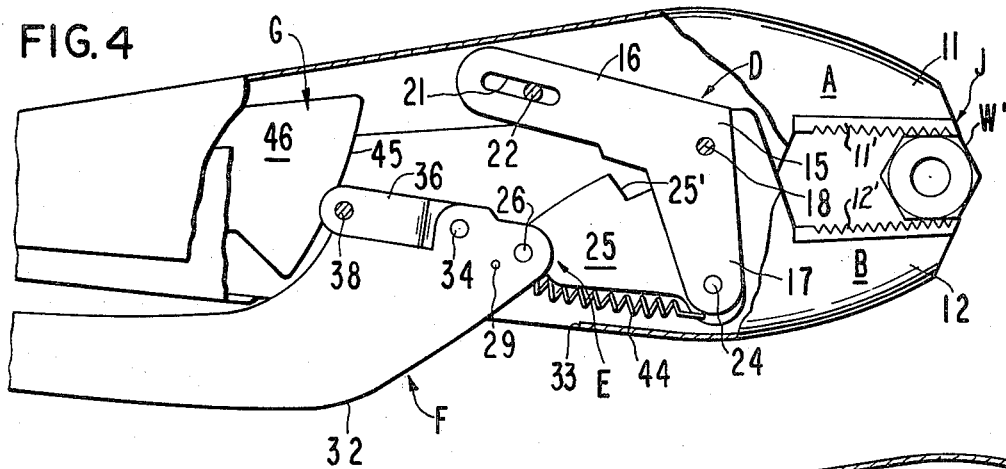
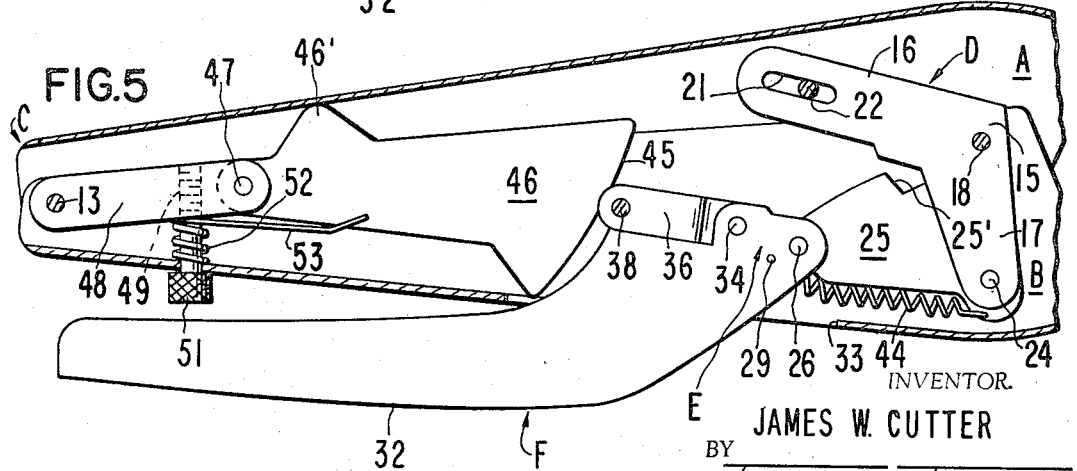

3,379,079
CLAMPING AND LOCKING APPARATUS
James W. Cutter, 276 Galli Drive,
Los Altos, Calif. 94022
Filed Feb. 16, 1966, Ser. No. 527,697
9 Claims. (Cl. 81—367)

The present invention is directed broadly to clamping and locking apparatus and particularly to hand vises or wrenches which will apply a selectible uniform pressure to the workpiece being held regardless of the size of the workpiece within the range of the particular tool incorporating the technique of construction as described herein.

While the present invention is broadly directed to clamping and locking devices and mechanisms such as useful for clamps, latches, catches and the like and to a locking mechanism including a toggle joint the ends of which are movable with movement of the device to maintain the length of the toggle joint in locking position substantially constant, the invention is particuarly directed to a hand vise embodying such features. Therefore, the invention will be described with reference to a hand vise.

Various types of hand vises, typically utilizing a toggle joint, have been produced in the past to apply a pressure between jaws of the device to a workpiece for rigidly holding the workpiece or clamping the tool to the workpiece.

The primary disadvantage of these devices lies in the fact that an adjustment must be made in the device to vary the position of one end of the toggle joint in order to change the ultimate position of the movable jaw when the device is in locking position. An improper adjustment of this adjusting mechanism in prior art devices results in either too little or too much pressure required to apply the device to the workpiece. If too little pressure is required, the operator would have to open the tool, make a new adjustment of the adjusting mechanism and reapply the tool hoping that the adjustment was of the desired amount. If too great a pressure is required, the operator might not be able to apply the tool and therefore would have to make a readjustment, or the device might be locked onto the work to such a pressure that not only is the surface of the work damaged by the teeth typically provided on the pressure applying jaws of such a device, but also the device is difficult to remove from the work.

Another problem with the prior devices has been the fact that the jaws of the tool have work engaging faces which are parallel at only one spacing between jaws and the connection between jaws has been such that minor changes from this spacing of parallel jaws results in a large angle between the jaws so that in all but one jaw position the jaws grip the workpiece along only one line of contact across the face of the jaw.

The object of the present invention as applicable to a hand vise is to provide an easily operated tool which will adapt to workpieces of different sizes within the range of the particular tool for locking the tool on the workpiece with a desired uniform pressure regardless of the size of the workpiece within that range. Additionally, the invention includes the provision of means for adjusting the desired clamping pressure and the provision of work locking jaws which remain substantially parallel over a wide expansion and contraction of the jaws for gripping the work to be held at a number of different positions.

Broadly stated, the present invention as applicable to hand vises or wrenches and to be described in greater detail below is directed to a clamping tool including first and second actuating arms rotatably connected together at their one ends, a rotatable member rotatably connected to each of the arms for movement of the arms to open and close their other or work clamping ends, and a locking mechanism, typically a toggle joint, connected to the rotating member for causing rotation thereof and the arms thereby to move the arms into locked position. With this construction, the maximum angle between the work clamping ends of the arms is small during opening and closing of the tool.

In accordance with another aspect of this invention, the locking mechanism is provided with associated means for moving the locking mechanism a distance equal to any movement of the locking mechanism due to rotation of the rotating member whereby the rotating member can be rotated to move the arms such as to move the jaws against a workpiece of any size that will fit therebetween and actuation of the locking member will lock the jaws against the workpiece with a preselected pressure regardless of the size of the workpiece.

It will be appreciated that the desired amount of pressure to be applied by the jaws of the hand vise in a typical operating environment can be preselected and the tool used for working with any of a number of different workpieces in this environment without making further adjustment.

In accordance with another aspect of the present invention, the tool is provided with means for changing the locking mechanism and in the case of a toggle joint, changing the length of the toggle joint in locking position for changing the pressure applied by the jaws to the workpiece. Thus, the same device can be adjusted for use in different environments where different pressures are typically required or can be adjusted in any particular environment to apply different pressures to different workpieces as desired.

In accordance with still another aspect of the present invention, the hand vice tool is provided with a work engaging jaw on the free end of each actuating arm with the face of each jaw forming an acute angle with a radius between the rotatable connection of the arms and the remotest portion of the jaw therefrom. With this construction, while the angle between the jaws is maintained at a minimum over the operating range, the work engaging faces of the jaws are arranged substantially parallel at their widest position to engage wide workpieces over a broad face and are arranged at a minimum angle in nearly closed position so that substantially only the tips of the jaws are engaged as usually desired for clamping thin workpieces.

A still further aspect of the present invention is the provision of a lock releasing link in the toggle joint of the locking mechanism for ease in opening the device when in a locked position.

Other objects and advantages of this invention will become apparent when reading the following description and referring to the accompanying drawing in which similar characters of reference represent corresponding parts in each of the several views.

In the drawings:

FIG. 1 is a plan view, partially broken away, of a work clamping device in accordance with the present invention and positioned in open position ready for application to a workpiece;

FIG. 2 is a view similar to FIG. 1 but with the device applied to a workpiece and the handle of the device partially closed;

FIG. 3 is a view similar to a portion of FIG. 2 but with the handle in completely closed position to lock the device on the workpiece;

FIG. 4 is a view similar to FIG. 3 but with a different size workpiece located between the jaws of the device;

FIG. 5 is a view similar to FIG. 4 but further broken away and showing the device adjusted to apply greater pressure to the workpiece;

FIG. 6 is a view of one end of the device shown in

FIG. 1 but with the jaws in completely closed position; and

FIG. 7 is a plan view partially broken away of an alternative construction of one end of a work clamping device as shown in FIG. 5.

As pointed out above, while the present invention is applicable to clamping and locking devices of a wide variety, it is particularly useful for hand vises or wrenches and will be described in detail with respect thereto.

Referring now to the drawings, with particular reference to FIG. 1, there is shown a clamping tool constructed in accordance with the present invention in its open or unlocked position. The tool is generally made up of two actuating arms A and B rotatably connected together at their one end and provided at their free end with work engaging jaws J. The rotatable connection permits movement of the jaws J toward and away from one another as controlled by a rotating member D rotatably connected to arm B and slidably connected to arm A. This member D is connected to a locking mechanism E including a handle F, the mechanism E being shown as a toggle joint with its one end connected to the member D and the location of its other end when in locking position controlled by a pressure controlling assembly G. With this construction the jaws are rotated about the ends C of arms A and B by actuating handle F to rotate member D and move the lower end of the toggle joint E with the pressure controlling member G a distance equal to the movement of the other end of the toggle joint E upon rotation of member D so that the jaws engage work placed therebetween with a uniform pressure regardless of the size of the workpiece. The pressure controlling assembly G can be moved to change the amount of pressure applied to the workpiece when the locking assembly E is moved to locking position.

In the particular embodiment shown, the arms A and B are in the form of channel shaped members 11 and 12 of, for example, steel, provided at their free end with jaw plates 11' and 12', respectively, of, for example, steel, secured to the arms 11 and 12 such as by welding. The arms 11 and 12 are rotatably connected at their ends C by means of a pivot pin 13 passing through opposed apertures in the sides of each of the channels. The thickness of arm 12 is selected slightly less than the channel opening in arm 11 so that arm 12 can be slidably received within arm 11 to move the jaws 11' and 12' together until they contact one another as shown in FIG. 6.

The jaws 11' and 12' are provided with work engaging toothed faces with the plane of the teeth ends on each jaw making a small acute angle Z with a radius extending between the pivot pin 13 at the end C of the device to the tip of the jaw. With this construction the jaws when completely closed as shown in FIG. 6 contact one another primarily only at their outer ends where clamping action is usually desired on very thin objects. However, as the jaws are opened the work engaging faces of the jaws more closely approach parallelism, and since the arms are rotated about the pivot point at the far end C of the device, a minimum amount of angulation of the faces results upon opening and closing of the jaws.

Movement of the jaws is controlled by rotating member D in the form of a bell crank 15 such as of steel having arms 16 and 17 extending from the central portion thereof. The bell crank 15 is formed in a channel shaped manner to receive a portion of the toggle joint as described in greater detail below. This bell crank 15 is rotatably connected to the arm 12 by a pin 18 which passes through an aperture 19 in the central portion of the bell crank and has its ends seated in apertures in the arm 12. Bell crank arm 16 is provided near its free end with a longitudinal slot 21 which is adapted to slidably receive a pin 22 having its ends seated in apertures through the channel sides of arm 11.

The other bell crank arm 17 is provided at its free end with an aperture 23 adapted to rotatably receive a pin 24 which connects arm 17 to one corner of a somewhat triangularly shaped link 25 of the toggle joint E. Another of the corners of the link 25 is provided with a stopping surface 25' which serves to stop movement of the toggle link 25 and thus movement of the handle F when in open position as shown in FIG. 1. The other corner of link 25 is rotatably connected via a pin 26 to the handle F such as of steel and channeled shaped in cross section, the ends of pin 26 being seated in apertures 27 in the handle F. Also, the corner of link 25 which is connected to the handle F is provided with an extension tip 28 projecting therefrom toward and within the handle F for engagement against a pin stop 29 which has its ends held in aperture 31 to prevent the toggle joint from moving any appreciable distance beyond dead center as shown in FIG. 3. The handle F has a gripping portion 32 which projects out of the arm 12 through a slot 33.

Rotatably connected to the handle F via a pin 34 passing through aperture 35 spaced a short distance from apertures 27 is a toggle joint releasing link 36. The end of this releasing link 36 connected to the handle 32 is a flat plate received within the channel portion of the handle F while the opposite end of releasing link 36 is bifurcated and apertured at 37 to receive a pin 38 which rotatably supports a shoe member 39 within the bifurcations of the link 36 with the ends of pin 38 slidably seated in slots 41 in the channel sides of actuating arm 12. This releasing link 36 is provided with a flat surface 42 mating with a flat surface 43 on the handle F for application of pressure from the handle F against the link 36 when moving the toggle joint E into locking position. The link 25, the handle F, and the releasing link 36 and the apertures in these members are so proportioned that upon movement of the toggle joint to locking position as shown in FIGS. 3 and 4 pins 24, 26 and 38 are aligned substantially in a straight line, pin 26 being slightly outside this line, whereas pin 34 is located a short distance inwardly of the device from this line toward unlocked position to provide a lever action for the grip portion 32 of the handle F to release the lock of the toggle joint.

The shoe 39 within releasing link 36 is connected via a spring 44 to the link 25 for maintaining the engaging surface of the shoe 39 against a surface of the pressure controlling assembly G as described in detail below, for moving the jaws against the work before the toggle link is shifted when handle F is first moved, and for moving the toggle joint to unlocked position as shown in FIG. 1 from locked position as shown in FIG. 3 once the locking action has been broken by rotating the handle F about the pin 34.

The pressure controlling assembly G includes a pressure controlling member 46 such as of flat steel stock rotatably connected via a pin 47 to one end of a channel shaped link 48 such as of steel. The other end of link 48 is rotatably mounted on the pivot pin 13 at the end C of the device, and an adjustment screw 49 passing through an aperture in arm 12 and provided with a knurled turning head 51 is threadably engaged with the link 48 to change the position of the pressure controlling member 46 for varying the pressure applied to the work by the jaws of the device when the device is locked onto the work piece. Pressure controlling member 46 includes a protrusion or actuating cam 46' on its surface closest to the bottom of the channel making up arm 11. So that member 46 follows the movements of arm 11, a coil spring 52 is provided on the screw 49 for bearing against leaf spring 53 which urges the cam 46' of pressure controlling member 46 against the bottom of the channel in actuating arm 11.

Adjacent the toggle joint E the end of the pressure controlling member 46 is provided with a cam surface 45 for engagement with the shoe 39 to establish the position of one end of the toggle joint E in locking position. The curvature of cam surface 45 is selected such that upon closure of the jaws of the device which results from rotation of bell crank 15 and therefore movement of the end of the toggle joint E at pivot pin 24, the portion of cam surface 45 which lies over slot 41 and therefore is contacted by shoe 39 foreshortens the movement of shoe 39 by an amount equal to the movement of pin 24 by rotation of the bell crank 15. In this manner the length of the toggle joint in locking position is maintained constant regardless of whatever the spacing between the jaws 11' and 12' so that the same pressure will be applied by the jaws against the work positioned therebetween regardless of the size of the work. The cam surface 45 can be roughened or serrated so as to prevent slippage once engaged with shoe 39, and shoe 39 can be similarly roughened or serrated to engage cam surface 45.

By the utilization of the cam 46' for controlling the movement of arm 46, the slope of cam surface 45 can be maintained at a minimum. Thus, as the arms 11 and 12 close, pressure controlling member 46 is caused to swing across slot 41 with a greater movement. Were it not for this movement and construction of member 46, the slope of cam surface 45 would have to be so steep that the device would tend to lock in open position.

The operation of the device in accordance with the present invention as applied to a work piece of a given size can be illustrated by reference to FIGS. 1, 2, and 3. Initially, the device as shown in FIG. 1 is inserted onto the work W and a gripping force applied to the handle F to first cause rotation of bell crank 15 so that the jaws 11' and 12' engage the work W. At this point arms 11 and 12 have moved together to position a portion of cam surface 45 over the slot 41 so that the cam surface 45 will compensate for movement of pin 24 upon rotation of bell crank 15 so that the length of the toggle link joint E in toggle position is maintained at a desired constant length. Upon further motion of the handle F, pin 38 is caused to slide in slot 41 to move the shoe 39 down until it engages cam surface 45 as illustrated in FIG. 2. At this point the device is ready to be moved into locking position to apply locking pressure by the jaws 11' and 12' against the work W.

Additional gripping force is applied to handle F to move the handle from the position shown in FIG. 2 to the position shown in FIG. 3 wherein the toggle link E is moved into locking position and prevented from substantial movement beyond locking position by engagement of extension tip 28 against pin stop 29. At this point pins 24, 26 and 38 are aligned substantially along a straight line with pin 26 slightly beyond the line so that the toggle joint exerts rotational force on bell crank arm 17 to cause bell crank 16 to force pin 22 which is secured to jaw 11 toward jaw 12.

As the arms 11 and 12 approach full locked position, the resisting force applied by the work to the jaws is directed by the shoe 39 against pressure controlling member 46. The action of the shoe 39 against member 46 while tending to apply pressure through cam 46' to open arms 11 and 12 results in a lesser pressure than that applied by the bell crank to close the arms 11 and 12. Therefore, the pivot 47 is caused to shift slightly against the action of spring 52 so that screw 51 projects slightly outwardly of the arm 12.

In order to release the lock of toggle joint E, handle F is moved in the opposite direction to produce a lever action causing pin 26 to rotate about pin 34 and thereby to move pin 26 back across the line between pins 24 and 38 thereby to release the locking action of the toggle joint. At this point spring 44 causes the toggle joint E to move back to unlocked position as shown in FIG. 1 and in which surface 25' butts up against pin 18 to prevent further opening of the toggle joint.

FIG. 4 illustrates the locking of the device onto a workpiece W' smaller than workpiece W but with the same pressure as applied by the jaws against the workpiece W shown in FIG. 3 and without any special adjustment of the device. Referring now to FIG. 4, when the handle F is first actuated, the jaws 11' and 12' are caused to move against workpiece W'. In this movement, the bell crank 15 rotates about pin 18 a greater degree than when the device first engaged workpiece W as shown in FIG. 2. This greater rotation results in a greater movement of pin 24 which serves as one end of the toggle joint but the pressure controlling member 46 compensates for this increased movement of pin 24 by moving the cam surface 45 across slot 41 so that when the shoe 39 is caused to engage the cam surface 45, the portion of the cam surface 45 which is engaged has compensated for the movement of pin 24 so that the length of the toggle linkage is maintained constant. Therefore, when a continued gripping action is applied to handle F to move the toggle joint F to locking position as shown in FIG. 4, the same amount of pressure will be applied to workpiece W' by the jaws 11' and 12' as applied to workpiece W in the position shown in FIG. 3.

In order to change the amount of pressure applied against the workpiece by the jaws of the device, the cam surface 45 is simply moved via rotation of adjustment screw 52 to a new position such as shown in FIG. 5 and wherein the length of the toggle link in locking position is shortened. Again, with the pressure controlling member 46 in the position shown in FIG. 5, the jaws of the hand vises will apply this new pressure to the workpiece engaged regardless of the size of the workpiece.

While one method of changing the position of cam surface 45 to vary the desired amount of pressure has been illustrated thus far, other structures can be utilized. For example, as shown in FIG. 7 the pressure controlling member 46" can be secured to a screw 49' journaled at the end C of the device (or some other suitable location) whereby rotation of the screw 49 effectively changes the position of cam surface 45 to increase or decrease the amount of pressure applied by the jaws as desired.

Similarly, other devices or structures for changing the free end of the locking assembly can be utilized besides that shown so long as the structure produces a movement of one end of the locking mechanism corresponding to the movement of the other locking mechanism as the jaws are closed onto different sized workpieces.

Obviously, instead of being a separate element it might be desired to make the shoe 39 integral with the releasing link 36. Also, where appropriate the members may be made out of hardened steel or other materials.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A clamping apparatus comprising, in combination: first and second actuating arms; means connecting said arms together for rotating one end of each of said arms about a common axis for movement of the other ends of said arms in directions toward and away from each other; work engaging means secured on the other end of each of said arms; means mounted intermediate the ends of said arms for locking said arms relative to each other, said locking means including a toggle joint movable from an unlocked position to a locked position for forcing said arms toward one another, said arms being retained proximate each other when the toggle joint is in the locked position; said toggle joint having two end pivot pins and at least one intermediate pivot pin, and means providing equal movement of said end pivot pins relative to each other when said toggle joint is in the locked position and said arms are moved together and away from one another whereby said work engaging means will maintain the same force on any size workpiece held therein.

2. The apparatus according to claim 1 with means for adjusting the length of the spacing between said end pivot pins measured at the beginning of movement of said toggle joint into the locked position whereby selectively to change said workpiece gripping pressure.

3. A clamping apparatus comprising, in combination: first and second actuating arms; means connecting said arms together for rotation about a common axis for movement of one end of said arms together and apart; rotating means connected to both of said arms for causing relative movement of said arms upon rotation of said rotating means; a locking mechanism; connecting means joining said locking mechanism to said rotating means for locking said arms; and means cooperatively engageable with said locking mechanism for producing a movement of said locking mechanism substantially equal to the movement of said connecting means by rotation of said rotating means whereby the operating length of said locking mechanism in each of a plurality of locking positions is maintained constant.

4. A work clamping tool apparatus comprising, in combination: first and second actuating arms; means connecting said arms together for rotatioin about a common axis for movement of one end of said arms together and apart; a work clamping jaw secured on said one end of each of said arms; rotating means connected to both of said arms for causing relative movement of the jaws of said arms upon rotation of said rotating means; a locking mechanism; connecting means joining said locking mechanism to said rotating means for locking said arms with work held between the jaws of said arms; and means cooperatively engageable with said locking mechanism for producing a movement of said locking mechanism substantially equal to the movement of said connecting means by rotation of said rotating means whereby the jaws of said arms apply pressure against work placed therebetween when said locking mechanism is moved to a locked position and said applied pressure is substantially the same regardless of the size of the work.

5. A clamping apparatus comprising, in combination: first and second actuating arms; means connecting said arms together for rotating one end of each of said arms in directions toward and away from each other; work engaging means secured on the other end of each of said arms; means mounted intermediate the ends of said arms for locking said arms relative to each other, said locking means including a toggle joint movable from an unlocked position to a locked position for forcing said arms toward one another, said arms being retained proximate each other when the toggle joint is in the locked position, said locking means also including means for automatically maintaining a substantially constant spacing between the ends of the toggle joint at the beginning of movement thereof into the locking position irrespective of the size of the work between the work engaging means.

6. A work clamping tool comprising: first and second actuating arms, said arms being channel shaped with the second arm having a thickness less than the channel opening in said first arm for slidable insertion of said second arm in said first arm with the channels of the arms facing one another; a pivot pin; each of said arms having opposed apertures through the sides of the channel at one end of the arm for receiving said pivot pin whereby said arms are rotatable about said pivot pin for movement of said arms toward and away from one another; a work clamping jaw secured on the other end of each of said arms; a toggle joint mounted intermediate said one and said other ends of said arms and movable from an unlocked position to a locked position for forcing the jaws of said arms against the work, said arms being retained proximate each other when said toggle joint is in locked position; a bell crank pivotally secured intermediate its ends to said second arm, one end of said bell crank pivotally connected to one end of said toggle joint and the other end of said bell crank slidably connected to said first arm whereby application of pressure by said toggle joint on said one end of said bell crank produces rotation thereof about the pivot support centrally thereof thereby to cause said other end of said bell crank to produce relative movement between said jaws of said arms.

7. The work clamping tool of claim 6 wherein said toggle joint includes a first link, a handle, a lock releasing link, and a shoe, one end of said first link being said one end of said toggle joint pivotally connected to said one end of said bell crank and the other end of said first link pivotally connected to said handle, said handle pivotally connected to one end of said releasing link at a point on said handle spaced from the pivotal connection of said handle and said first link, the other end of said releasing link pivotally connected to said shoe and slidably connected to said second arm, said first link, said handle, and said lock releasing link constructed such that the pivotal connections between said first link and said one end of said bell crank, between said handle and said first link, and between said lock releasing link and said second arm are substantially aligned along a single line when said toggle joint is moved into locking position and said pivotal connection between said handle and said lock releasing link is a short distance from said line in the direction of said unlocked position and a pressure controlling assembly provided with a cam surface engaged by said shoe when said toggle joint is moved from unlocked to locked position, said cam surface related to the distance between said jaws such that said cam surface causes movement of said shoe at the other end of said toggle joint equal to the movement of said one end of said toggle joint responsive to associated rotation of said bell crank to maintain constant the length between said one and said other end of said toggle joint when in locking position.

8. The tool of claim 7 including means for moving said pressure controlling assembly to change the position of said cam surface and thereby change the length between said ends of said toggle joint at the start of movement of the toggle joint into the locking position for changing the amount of pressure applied to a workpiece of any size positioned between the jaws of said actuating arms.

9. The tool of claim 6 wherein each of said jaws is provided with a face forming an acute angle with a radius between said pivot pin and the remotest portion of the jaw therefrom.

References Cited
UNITED STATES PATENTS 2,705,899  4/1955  Berger _____ 81—380 X

FOREIGN PATENTS 329,571  9/1935  Italy.

OTHELL M. SIMPSON, *Primary Examiner.*

WILLIAM FELDMAN, *Examiner.*

G. WEIDENFELD, *Assistant Examiner.*